A. ORTMAYER.

GIG-SADDLE.

No. 6,969. Reissued Feb. 29, 1876.

WITNESSES

W. F. Harbach

H. M. Matthews

INVENTOR

Andrew Ortmayer

By F. F. Warner his Atty.

N. PETERS, PHOTO-LITHOGRAPHER, WASHINGTON, D. C.

UNITED STATES PATENT OFFICE.

ANDREW ORTMAYER, OF CHICAGO, ILLINOIS.

IMPROVEMENT IN GIG-SADDLES.

Specification forming part of Letters Patent No. 162,095, dated April 13, 1875; reissue No. 6,969, dated February 29, 1876; application filed February 1, 1876.

*To all whom it may concern:*

Be it known that I, ANDREW ORTMAYER, of Chicago, in the county of Cook and State of Illinois, have invented certain new and useful Improvements in Gig-Saddles, of which the following is a specification:

My invention consists, first, in dispensing with the ordinary saddle-tree into which the terrets are usually secured, and in using, instead thereof, metal plates or nuts, arranged to receive the terret screws or bolts, and secured in pockets on the under side of the skirts; and, secondly, of a removable pad, having in its upper face an opening to allow the bolt and nut of the check-hook to enter the stuffed part of the pad; and, thirdly, of a removable pad, having therein such an opening, in combination with a loop extending across the forward end of the opening, and adapted and arranged to receive the check-hook, all substantially as hereinafter more fully set forth.

Figure 1:
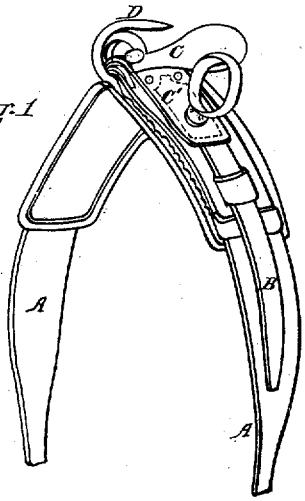
Figure 2:
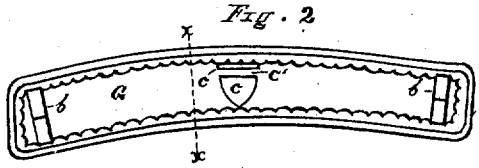
Figure 3:
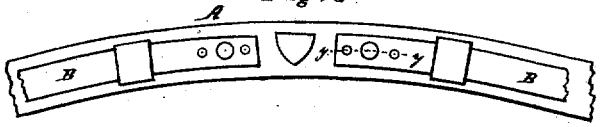
Figure 4:
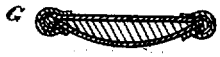
Figure 5:
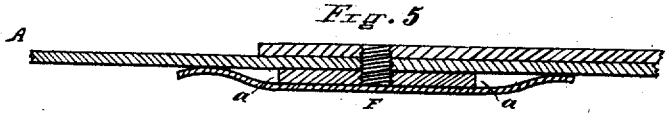

Figure 1 is a perspective view of my improved gig-saddle and pad. Fig. 2 is a plan view of the pad. Fig. 3 is a plan view of the skirt. Fig. 4 is a cross-section of the pad at *x x*, and Fig. 5 a section in the plane of the line *y y*.

A A represent the skirts, and B B the billets, each billet consisting of one piece of leather, and being secured by rivets and loops to the skirts. C is the metal jockey, to which the check-hook D is secured. The jockey has two wings, C′ C′, which project over the billets a little farther than the terret-rings, the bolts of which pass through the wings near the ends of the latter. These bolts also pass through holes in the billets and skirts, and are screw-threaded at their lower ends, and these ends enter plates or nuts *a a*, secured in pockets on the under side of the skirts. These plates are of considerable size, and each has a female screw near its center to receive the terret-screws, and performs the functions of a nut with relation to the screw which enters it. These plates are also kept in place, and are covered and concealed, by leather covers F F stitched to the under side of the skirts.

It has been the custom, in completing a saddle, to form a pad to fit the tree, and to attach the pad permanently thereto. With my saddle, however, it is only necessary to use a removable pad, G, which is cut or slotted, as shown at *c c*, so as to form a loop, *c′*, adapted and arranged to receive the hook D, and thus fasten the pad to the saddle at that point, but admitting of the easy removal of the pad. The pad may also be hung to the skirts by loops *b b* in the ordinary manner.

By this manner of fastening the terret-bolts, in case one should break, it can be replaced without ripping the saddle, and the removable pad, by having therein the loop *c′*, is held steadily in its place. In forming the loop *c′* I deem it preferable to make the rear slot sufficiently large, as shown, to receive the screw and nut on the check-hook. The said screw and nut are thus allowed to enter the stuffed part of the pad, and, by this means, they are prevented from pushing the pad downward away from the saddle, as they would do if they rested, as heretofore, against the upper face of the pad.

Having thus described my invention, what I claim as new, and desire to secure by Letters Patent, is—

1. In a gig-saddle the combination, with the metal jockey, of the skirts A A, provided with the pockets F F to secure the plates or nuts *a a*, the said plates each having a screw-threaded hole for the reception of the terret-ring bolts, substantially as specified.

2. In combination, the metal jockey, provided with the check-hook D, fastened thereto by means of a nut on the under side of the jockey, and the removable pad G, having an opening in its upper face to allow the said nut and the bolt of the hook to enter the padding of the pad, substantially as and for the purposes specified.

3. The combination, in a gig-saddle, of the check-hook D with the removable pad G, having therein the loop *c′*, adapted and arranged to receive the check-hook, and extending across the forward end of an opening adapted and arranged to receive the nut and screw of the check-hook when the pad is fastened to the latter by means of the said loop, substantially as and for the purposes specified.

ANDREW ORTMAYER.

Witnesses:
F. F. WARNER,
O. W. RICHARDSON.